No. 625,087. Patented May 16, 1899.
R. P. & L. B. CURTIS.
MACHINE FOR THREADING AND CUTTING OFF PIPE.
(Application filed Dec. 31, 1897. Renewed Nov. 4, 1898.)
(No Model.) 2 Sheets—Sheet 1.
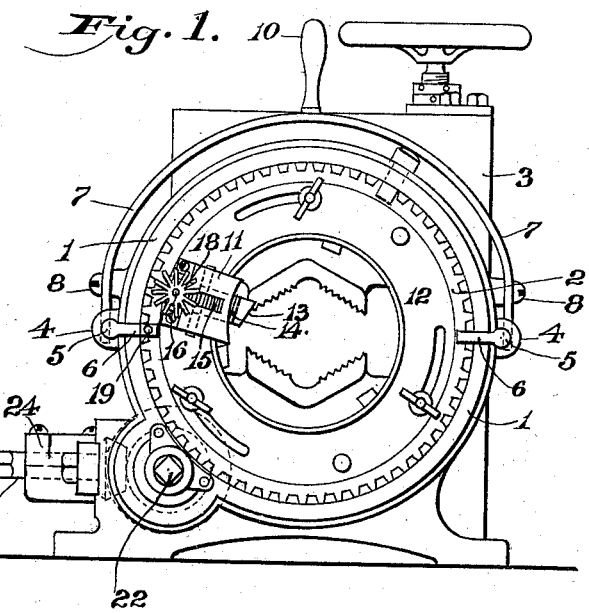
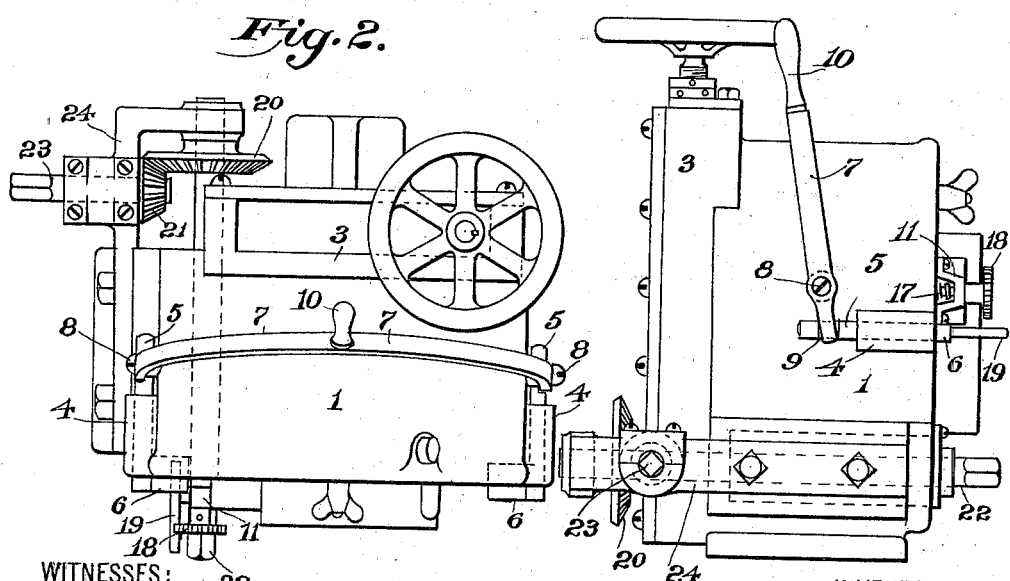
WITNESSES:
INVENTORS
R. P. Curtis
L. B. Curtis
BY
ATTORNEY No. 625,087. Patented May 16, 1899.
R. P. & L. B. CURTIS.
MACHINE FOR THREADING AND CUTTING OFF PIPE.
(Application filed Dec. 31, 1897. Renewed Nov. 4, 1898.)
(No Model.) 2 Sheets—Sheet 2.
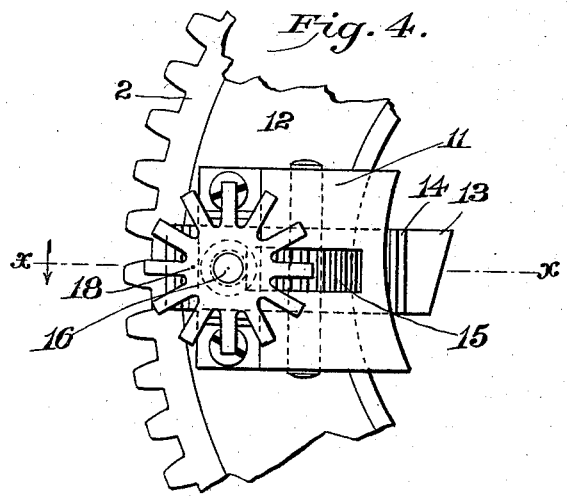
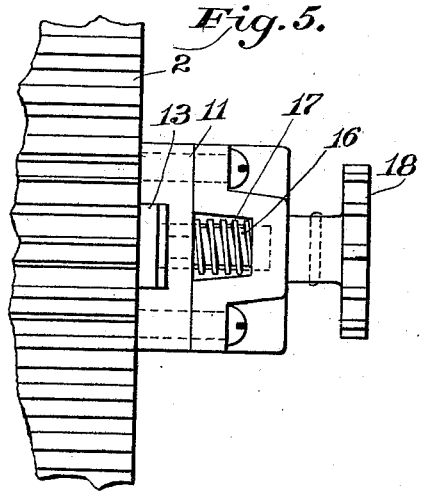
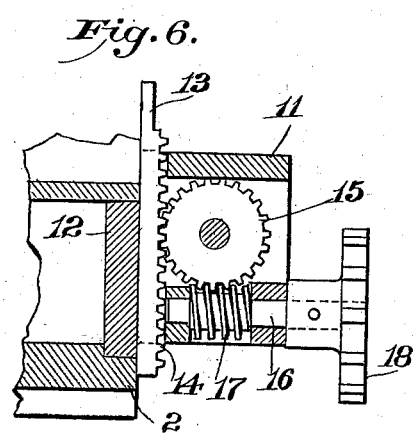
WITNESSES:
INVENTORS
R. P. Curtis
L. B. Curtis
BY
ATTORNEY

UNITED STATES PATENT OFFICE.

RODERICK P. CURTIS AND LEWIS B. CURTIS, OF SOUTHPORT, CONNECTICUT, ASSIGNORS TO CURTIS & CURTIS, OF BRIDGEPORT, CONNECTICUT.

MACHINE FOR THREADING AND CUTTING OFF PIPE.

SPECIFICATION forming part of Letters Patent No. 625,087, dated May 16, 1899.

Application filed December 31, 1897. Renewed November 4, 1898. Serial No. 695,515. (No model.)

*To all whom it may concern:*

Be it known that we, RODERICK P. CURTIS and LEWIS B. CURTIS, citizens of the United States, residing at Southport, in the county of Fairfield and State of Connecticut, have invented certain new and useful Improvements in Machines for Threading and Cutting Off Pipe; and we do hereby declare the following to be a full, clear, and exact description of the invention, such as will enable others skilled in the art to which it appertains to make and use the same.

Our invention relates to that class of machines for threading and cutting off pipe which comprise a toothed die-carrying ring that rotates within and is supported by a casing; but more particularly does our invention have reference to devices for automatically and uniformly feeding the cut-off tool in instances where the pipe is to be cut off, while at the same time we provide instrumentalities for obtaining the proper movements of the die-carrying ring when the pipe is to be threaded.

The object of our invention is to provide means for effecting the automatic feeding of the cut-off tool at each complete rotation of the die-carrying ring without at all impairing the efficiency of the machine in that the latter may readily be thrown into operation for the purpose of threading pipe.

With these ends in view our invention consists in certain details of construction and combination of parts, such as will be hereinafter fully set forth and then specifically designated by the claims.

In the accompanying drawings, which form a part of this application, Figure 1 is a front elevation of our improved machine; Fig. 2, a plan view; Fig. 3, a side elevation; Fig. 4, a broken detail front elevation, on an enlarged scale, illustrating particularly the devices used for feeding the cut-off tool; Fig. 5, a side elevation of the construction shown at Fig. 4, and Fig. 6 a section at the line *x x* of Fig. 4.

Similar numbers of reference denote like parts in the several figures of the drawings.

In the present construction the means employed for thrusting the die-carrying ring bodily toward the pipe to be threaded is substantially the same as that for which Letters Patent No. 443,500 were issued to us December 30, 1890; but in the present instance we have shown this patented construction duplicated, so that the die-carrying ring is thrust inward by the operation of fingers at two points which are diametrically opposite. Although this present construction is fully covered by our Letters Patent referred to, we will fully describe the same hereinafter in order that a clear understanding may be had of our present improvement, especially in respect to the manner in which the machine is converted from a pipe-threading to a pipe-cutting-off machine, and vice versa.

1 is the usual casing; 2, the toothed die-carrying ring capable of rotating and sliding within said casing, and 3 is the usual pipe-holding vise at the rear of the casing.

4 are boxes cast with the outside of the casing at diametrically opposite points and in direct line with the axis of rotation of the die-carrying ring. These boxes are bored out lengthwise, and the casing itself is slotted, the slots leading directly into the boxes. 5 are bars which are fitted within these boxes so as to move freely lengthwise thereof, and 6 are fingers integral with the outer ends of these bars and which extend inwardly through the slotted casing and against the face of the die-carrying ring or a part moving in harmony therewith. These fingers are diametrically opposite each other, so that they are in the same plane with the axis of rotation of the die-carrying ring, and therefore any force simultaneously applied to these fingers, so as to thrust them against the face of the die-carrying ring, will cause this ring to be uniformly and steadily thrust inward, the fingers meantime sliding through the slotted portions of the casing. In order to operate these fingers uniformly and at the same time, we provide a forked lever 7, which is pivoted at 8, near the ends of its forks, directly to the casing and immediately above the bars 5, the extreme ends of these forked portions of the lever extending loosely through notches 9 in these bars, while the top of the lever is provided with any suitable handle 10. By grasping this handle 10 and pulling it forward the bars 5 will be retracted, and the fingers 6 will thereby cause the die-carrying ring to be pulled inward without the slightest possibility of tilting or swaying, this being due to the fact that these fingers never change their relative positions with respect to the ring and are diametrically opposite each other. It will thus be seen that the die-carrying ring will be caused to properly approach the pipe to be threaded, so that the axis of such pipe will be coincident with and, in fact, the same as the axis of the die-carrying ring, and the threading-dies will therefore commence the threading operation in a true and exact manner.

After a nipple or a pipe-section has been threaded it quite frequently becomes necessary to cut off the threaded portion, or in many instances unthreaded sections of pipe are to be cut off, and machines of this description are therefore equipped for both threading and cutting off pipe. In both instances the pipe is held securely within a vise during the operation of cutting off, and where the pipe has been previously threaded the threading-dies are either spread away from the pipe in the usual manner or the die-carrying ring is run forward until the threading-dies have backed off the pipe, it being of course necessary to relieve the die-carrying ring from any screw connection with the pipe or with any other object, so that the ring will merely revolve and not advance along its axis during the operation of cutting off.

Referring particularly to Figs. 4, 5, and 6, 11 is a box bolted or otherwise secured to the face-plate 12 of the die-carrying ring, and guided within and through suitable ways in the bottom of this box and extending directly upon and across this face-plate is the cut-off tool 13, which is capable of a free sliding movement within such ways. This cut-off tool has a rack 14 formed in its shank, and with this rack a pinion 15 meshes, which pinion is suitably journaled within the box 11. 16 is a shaft journaled within this box and carrying a worm 17, which engages with the pinion 15, said shaft extending outside of the box and having secured thereon a spur 18, which latter occupies a plane parallel with the face-plate.

19 is a pin which is inserted within a hole in one of the fingers 6, so as to be within the field of travel of the spur-fingers as the die-carrying ring is rotated. During the rotation of the die-carrying ring succeeding spur-fingers will strike against this pin 19 at each complete rotation of the ring, and this will of course effect the intermittent rotation of the spur, thereby effecting the intermittent inward feed of the cut-off tool 13. While we prefer to locate this pin within one of the fingers 6 and to make it long enough so that it will always be within reach of the spur, nevertheless it will of course be obvious that this pin may be located within the rim of the casing and may overhang so as to be within the field of the spur, and we therefore do not wish to be limited in this respect. It will of course be understood that the pin is readily detachable, so that it may be removed during the operation of threading the pipe, for otherwise it would cause the operation of the cut-off tool during the time when the ring had a sliding movement.

The toothed die-carrying ring is operated in the usual manner by means of an engaging pinion at the bottom of the ring, which pinion we have not illustrated, since it is not necessary so to do in connection with the present invention; but we have shown a pair of bevel-gears 20 21, which engage with each other and which are secured, respectively, on the shaft 22 of this pinion at the rear of the casing and on an auxiliary shaft 23, journaled in a bracket 24, supported by the casing, the function of which bevel-gears we will not describe herein, because they form a part of another invention, which is fully shown and described in an application for Letters Patent filed by us on even date herewith.

Having thus fully and in detail described our invention, what we claim as new, and desire to secure by Letters Patent, is—

1. In a machine for threading and cutting off pipe and which comprises a casing and a toothed die-carrying ring capable of rotating within said casing, the combination of the cut-off tool suitably guided and carried by said ring and provided with rack-teeth, the rotary spur suitably journaled and extended from the face of the ring in parallelism therewith, the worm carried by the shaft of said spur, the pinion suitably journaled and meshing respectively with said rack-teeth and with said spur, and a pin extending from a part of the machine stationary as to rotation said pin being within the field of travel of said spur, whereby at each complete rotation of the die-carrying ring the cut-off tool will be advanced, substantially as set forth.

2. The combination of the casing having hollow boxes formed therewith and having slots which lead into said boxes, the rotary die-carrying ring within said casing, the horizontal bars notched at their rear ends and supported within said boxes and provided with fingers which extend through the slotted portions of the casing against the face of the ring at points diametrically opposite to each other and in a line with the axis of rotation of said ring, the forked lever which straddles the upper portion of the casing and is pivoted to the latter at opposite sides and near the extremities of the forks while such extremities themselves extend loosely within the notches in said bars, the cut-off tool carried by said ring and suitably guided and provided with rack-teeth, the pinion meshing with said teeth, the rotary spur extending from the face of the ring in parallelism therewith and carrying on its shaft a worm which engages with said pinion, and the elongated pin detachably secured to one of said fingers and within the line of travel of said spur as the ring rotates, substantially as set forth.

3. The combination of the die-carrying ring, the box secured to the face thereof and carried thereby, the cut-off tool guided within suitable ways at the bottom of the box and provided with rack-teeth, the pinion journaled within said box and engaging with said teeth, the spur mounted upon a shaft journaled within said box which shaft also carries a worm that engages with said pinion, said spur extending from the face of the ring in parallelism therewith, and a pin within the field of travel of said spur and extending from a part of the machine stationary as to rotation, substantially as set forth.

In testimony whereof we affix our signatures in presence of two witnesses.

RODERICK P. CURTIS.
LEWIS B. CURTIS.

Witnesses:
F. W. SMITH, Jr.,
M. T. LONGDEN.